(12) United States Patent
Choi et al.

(10) Patent No.: US 8,491,705 B2
(45) Date of Patent: Jul. 23, 2013

(54) APPLICATION OF AMINE-TETHERED SOLID SORBENTS TO CO2 FIXATION FROM AIR

(76) Inventors: Sunho Choi, Atlanta, GA (US); Jeffrey H. Drese, Bartlesville, OK (US); Ronald R. Chance, Naples, FL (US); Peter M. Eisenberger, Princeton, NJ (US); Christopher W. Jones, Mableton, GA (US)

( * ) Notice: Subject to any disclaimer, the term of this patent is extended or adjusted under 35 U.S.C. 154(b) by 134 days.

(21) Appl. No.: 12/859,650

(22) Filed: Aug. 19, 2010

(65) Prior Publication Data
US 2011/0179948 A1    Jul. 28, 2011

Related U.S. Application Data

(60) Provisional application No. 61/235,223, filed on Aug. 19, 2009.

(51) Int. Cl.
    *B01D 53/02* (2006.01)
(52) U.S. Cl.
    USPC .......... 95/139; 95/114; 95/148; 96/143; 96/154
(58) Field of Classification Search
    USPC .......... 95/114, 139, 148; 96/121, 143, 154
    See application file for complete search history.

(56) References Cited

U.S. PATENT DOCUMENTS

| | | | |
|---|---|---|---|
| 5,376,614 A | 12/1994 | Birbara et al. | |
| 5,876,488 A * | 3/1999 | Birbara et al. | 95/139 |
| 6,117,404 A | 9/2000 | Mimura et al. | |
| 6,364,938 B1 | 4/2002 | Birbara et al. | |
| 6,540,936 B1 | 4/2003 | Takagi et al. | |
| 6,547,854 B1 * | 4/2003 | Gray et al. | 95/139 |
| 7,288,136 B1 * | 10/2007 | Gray et al. | 95/139 |
| 7,452,406 B2 | 11/2008 | Little et al. | |
| 7,795,175 B2 | 9/2010 | Olah et al. | |
| 2001/0004895 A1 * | 6/2001 | Preiss | 128/205.28 |
| 2005/0199124 A1 * | 9/2005 | Little et al. | 95/96 |
| 2006/0165574 A1 * | 7/2006 | Sayari | 423/210 |
| 2007/0217982 A1 * | 9/2007 | Wright et al. | 423/230 |
| 2008/0138265 A1 | 6/2008 | Lackner et al. | |
| 2009/0120288 A1 * | 5/2009 | Lackner et al. | 95/139 |
| 2010/0263534 A1 * | 10/2010 | Chuang | 95/139 |
| 2011/0088550 A1 * | 4/2011 | Tirio | 95/139 |
| 2012/0076711 A1 | 3/2012 | Gebald et al. | |

FOREIGN PATENT DOCUMENTS

| | | |
|---|---|---|
| DE | 200 01 385 U1 | 9/2000 |
| EP | 20021180511 A1 | 2/2002 |
| EP | 20021234947 A2 | 8/2002 |
| JP | 58 122022 A | 7/1983 |
| JP | 06-062677 | 3/1994 |
| JP | 07-051537 | 2/1995 |
| JP | 2001-300250 | 10/2001 |

OTHER PUBLICATIONS

Hicks, Jason C. et al.; "Designing Adsorbents for CO2 Capture from Flue Gas-Hyperbranched Aminosilicas Capable of Capturing CO2 Reversibly"; Feb. 2008; J. Amer. Chem. Soc., vol. 130, pp. 2902-2903.*
International Search Report and Written Opinion of the International Search Authority, dated Dec. 18, 2007, from corresponding International Application No. PCT/US2007/074615.*
Xu et al., "Preparations and characterization of novel CO2 'molecular basket' absorbents based on polymer-modified mesoporous molecular sieve MCM-41." Microporous and Mesoporous Materials, 62: 29-45 (2003).*
English abstract, CN 1 303 910 (Jul. 18, 2001).*
English abstract, JP 2006-021989 A (Jan. 26, 2006).*
Stolaroff, Joshuah et al. "A Pilot-scale prototype contractor for CO2 capture from ambient air; cost and energy requirements." www.ucalgary.ca/~keith/papers/84.Stolaroff.Air . . . .

* cited by examiner

*Primary Examiner* — Jason M Greene
(74) *Attorney, Agent, or Firm* — Paul J. Sutton; Barry G. Magidoff (57) ABSTRACT

A method for capturing $CO_2$ from the ambient air by the use of solid tethered amine adsorbents, where the amine adsorbents are tethered to a substrate selected from the group of silica, metal oxides and polymer resins. The tethered amines are joined to the substrate by covalent bonding, achieved either by the ring-opening polymerization of aziridine on porous and non-porous supports, or by the reaction of mono-, di-, or tri-aminosilanes, with silica or a metal oxide having hydroxyl surface groups. The method includes the adsorption of CO2 from ambient air, the regeneration of the adsorbent at elevated temperatures not above 120° C. and the separation of purified $CO_2$, followed by recycling of the regenerated tethered adsorbent for further adsorption of $CO_2$ from the ambient atmosphere.

18 Claims, 7 Drawing Sheets

APPLICATION OF AMINE-TETHERED SOLID SORBENTS TO CO2 FIXATION FROM AIR

This application claims the benefit of priority pursuant to 35 U.S.C. 119(e) from a U.S. provisional patent application having Application No. 61/235,223 filed Aug. 19, 2009.

BACKGROUND OF THE INVENTION

Growing concerns about climate change induced by anthropogenic CO2 accumulation has lead to interests in technologies that slow the growth of CO2 output or in sonic of the most ideal scenarios, halt the increase in atmospheric CO2 concentration. Ideally, society would rapidly switch to renewable energy sources such as wind, solar geothermal and biomass-derived energy because these non-fossil fuels based energy sources are carbon-neutral. However, given the scale of society's energy needs, it will be many decades before renewable fuels can bear the majority of the burden of powering our planet. In the meantime, fossil energy will continue to supply the bulk of the energy demand. In such a scenario, the atmospheric CO2 level will continue to climb above the current concentration of ~390 ppm.

One approach to capture $CO_2$ from fossil fuel combustion is to trap $CO_2$ at large point sources such as electricity generating power plants. However, roughly ⅓ of global carbon emissions are associated with distributed sources such as transportation fuels. Thus, large-scale deployment of carbon capture and sequestration (CCS) technologies at various point sources can at best slow the rate of increase of the atmospheric $CO_2$ concentration. What is needed is a carbon-negative technology, one that actually reduces the concentration of $CO_2$ in the atmosphere. Here, building on the limited existing work, we propose the direct capture of carbon dioxide from the ambient air using solid adsorbents specifically designed for this task as a new approach for reducing the concentration of $CO_2$ in the ambient air. The captured $CO_2$ could be sequestered semi-permanently, for example, underground, or used in a beneficial application, such as a feedstock for algae-based biofuels production.

When considering the possible ways of removing $CO_2$ from a gas mixture, several approaches can be considered, including cryogenic distillation, membrane purification, absorption with liquids and adsorption using solids. These methods are typically designed for concentrated $CO_2$ sources in the large-scale removal processes, such as flue gas treatment from large point sources including fossil fuel burning power plants or from natural gas streams contaminated with $CO_2$. For separation of $CO_2$ from very dilute sources, such as the ambient air, (e.g., approximately 390 ppm) many traditional methods such as cryogenic distillation and application of membranes are not expected to be cost-competitive. Keith and Dodge have demonstrated that classical absorption processes using basic chemicals such as alkali metal hydroxides dissolved in water can be used to extract $CO_2$ from the ambient air. However, this approach still appears to be quite expensive. Adsorption processes based on application of solid sorbents may be an alternate approach that is more cost-effective.

Many different types of solid adsorbents have been applied to $CO_2$ capture from flue gas and other moderately concentrated sources, (5-20% $CO_2$). However, when considering the unique constraints of direct "air capture" of $CO_2$ [the ubiquitous presence of water, low temperature operating window (ambient temperature to ~120° C.), dilute feed source (370-425 ppm)], many classes of adsorbents can be immediately ruled out. For example, all the physisorbents such as activated carbons and zeolites will suffer from overwhelming competitive adsorption of water over $CO_2$ in most cases. In addition, because the heat of adsorption on these solids is so low, physisorbents will have very low $CO_2$ adsorption capacities at the $CO_2$ concentration found in ambient air. In contrast, many of the chemisorbents such as calcium oxides and lithium zirconates require high temperature operating conditions above 300° C. Thus, these materials will not be useful in low-temperature air capture processes. On the other hand, chemisorbents based on solid-supported organic amines have properties such as low operating temperature and high heat of adsorption that make them potentially ideal sorbents for direct capture of $CO_2$ from the ambient air. We had found that hyperbranched aminosilica (HAS) adsorbents are highly useful as new effective adsorbents for $CO_2$ separation from mildly concentrated sources such as flue gas. In a follow-up study, we also showed that the adsorption properties such as $CO_2$ capacities and adsorption kinetics could be tuned by the synthesis conditions. There arc three classes of supported amine adsorbents (defined as those that employ any of primary, secondary, tertiary or mixture of these types of amine sites) reported to date:

(i) those based on impregnation (physical adsorption) of amine-containing small molecules or preformed oligomeric/polymeric amines into porous supports;

(ii) those based on covalent binding of amines to the surface of a support through use of silane coupling agents; and (iii) those based on in-situ surface polymerization of reactive amine monomers, creating covalently-bound amines to the silica substrates.

Previously Birbara et al. developed a class (i) supported amine adsorbent on a polymeric substrate such as acrylic esters, denoted as TEPAN from the reaction of tetraethylenepentamine (TEPA) and acrylonitrile (AN), targeting $CO_2$ capture from dilute gases to maintain a breathable air stream, for example on a space station. However, although this class (i) material enhances the regenerable cyclic $CO_2$ absorption capacity by more than two and half times compared to use of TEPA, this report lacks a detailed description showing the sorbents $CO_2$ capture performance, and no data are provided for ambient air conditions. In a series of patents, Wright et al. proposed using strong base ion exchange resins (quaternary ammonium compounds) as a means for direct $CO_2$ capture from the air. Although these claims primarily focused on more efficient designs of air capture devices involving anion exchange solids, it seems that the actual $CO_2$ capture performance needs further improvement. For example, average capture fluxes of 0.02~0.06 mmol $CO_2/m^2$/sec suggests this air collecting apparatus must have very large dimensions. Riecke et al. employed amine-containing hollow fiber membranes for $CO_2$ separation from breathing gas mixtures, while reporting a selectivity of at least 500 for $CO_2$ relative $N_2$. In this report, the $CO_2$ transportation mechanism was explained by the reversible formation of $HCO_3$ from $CO_2$ and $H_2O$, suggesting that humidity is indispensible for its operation. As a result, the authors described that this membrane exhibited extremely low transport capacity for $CO_2$ under dry ambient conditions. Furthermore, this is a membrane technology, not an adsorbent technology.

The aforementioned disclosures were rather broadly drawn but short on significant details on atmospheric $CO_2$ capture. Olah et al. provided information on the absorption performance of several solid sorbents from an experiment using gas mixtures of 370 ppm $CO_2$, 80% $N_2$, and 20% $O_2$. In this experiment, the powdered nanostructured silica absorbent comprising 47.5% polyethylenimine (PEI) and 10% polyethylene glycol (PEG) displayed a $CO_2$ absorption capacity of ~0.6 mmol/g at a temperature of 323 K. It should be noted that the supported amine sorbents described in these reports were prepared by simply mixing an amine solution with nonporous silica nanoparticles as the support (e.g., fumed silica with particles smaller than ~100 nm), creating no covalent linkage of the organic amines to the support.

Apart from the above-mentioned approaches, there have been attempts to employ the amidourea macrocycles as a $CO_2$ catching media. For example, Brooks et al. presented an experimental result suggesting that this macrocycle, when dissolved in dimethyl sulfoxide and tetrabutyl ammonium fluoride, enables atmospheric $CO_2$ fixation. Recently, Tossell explained by the computational method that $CO_2$ forms a complex in which a $CO_3$ agroup is held by a number of O—H—N bonds within the bowl-shaped cavity of the macrocyclic amidourea. Although it was suggested that such macrocycles might capture $CO_2$ from the ambient air, no experimental or simulation results verify this assertion. Furthermore, the macrocycle is hard to synthesize, not environmentally benign, and likely less efficient than conventional sorbents in terms of the capture capacity.

SUMMARY OF THE PRESENT INVENTION

We have now found that solid substrate-tethered amine adsorbents are useful for the capture of $CO_2$ from the ambient air, where the substrates include silica and other metal oxide substrates and solid hydrocarbon polymer substrates, preferably where the substrate is porous, so that the amine is tethered to the interior pore surfaces as well as to the outer surface. Our results demonstrate that such supported amine sorbents are able to capture considerable amounts of $CO_2$ from dilute sources. In accordance with the present invention, direct $CO_2$ capture from ambient air is achieved by adsorptive fixation on hybrid adsorbents comprising hyperbranched aminopolymers supported on various substrates including mesoporous silica, other porous silica, and metal oxides having surface hydroxide groups, and solid hydrocarbon polymers, under ambient conditions. This invention further provides for the direct $CO_2$ capture from ambient air, and the like, using a class (iii) supported amine adsorbent tethered to silica or a metal oxide or tethered to a polymer resin (preferably a hydrocarbon polymer), or supported amines of the class (ii) type, tethered to a metal oxide substrate through a silyl group. In these adsorbents, there is covalent tethering of the amine sorbent to the substrate.

The method of this invention further provides for the desorption of $CO_2$, and regeneration of the tethered adsorbent as the $CO_2$ is desorbed, at temperatures not greater than about 120° C., followed by recycling of the regenerated tethered adsorbent for further adsorption from the ambient atmosphere.

Substantially any metal oxide having surface hydroxyl groups can be used as the substrate, for both the Class (ii) and Class (iii) types. Such oxides include the oxides of transition metals (such as Iron, Titanium, Vanadium, Zirconium, Manganese, Niobium, Hafnium, Tantalum, Chromium. Molybdenum, Cobalt, Zinc, Copper), base metal oxides (such as Aluminum, Silicon, Germanium, Boron, Indium, Tin, Lead), as well as other common metal oxides such as those based on Calcium, Barium, Magnesium, Strontium, Cerium, or mixtures of any of these metal oxides.

Hyperbranched aminopolymers can be prepared by the ring-opening polymerization of aziridine on porous and nonporous supports, in which the amine functionalities provide the $CO_2$ capture capability of the supported adsorbents on the several substrates. In comparison to the previously mentioned techniques, this solid adsorbent system is easy to make, environmentally friendly, and potentially cost-effective, while providing considerable $CO_2$ capture performance from dilute sources, such as the atmosphere. We have further found that changes in the adsorption capacities and kinetics are correlated with the configurational variations of adsorbents, such as loading of aminopolymers, type of organic substance, type of substrate materials, etc. Regenerability of these hybrid adsorbents is also evaluated by tracing the $CO_2$ adsorption capacities over several operating cycles of adsorption and desorption.

The class (ii) tethered amine adsorbents can be prepared by the reaction of mono-, di-, or tri-aminosilanes, such as 3-aminopropyltrimethoxysilane;
3-(2-aminoethyl)aminopropyltrimethoxysilane; and
3-[2-(2-aminoethyl)aminoethyl]aminopropyltrimethoxysilane, with any of the metal oxides having hydroxyl surface groups, including silica.

These experimental results support using the class (iii) hybrid tethered amine adsorbent with hyperbranched polymers or, alternatively, class (ii) adsorbents prepared from silanes, for atmospheric $CO_2$ capture applications.

EXAMPLES OF PREFERRED EMBODIMENTS 2.1. Materials

Mesoporous silica nanoparticles (SBA-15) were synthesized following previously reported procedures. Specifically, Pluornic 123 (Aldrich) was used as a structure directing agent to template the one-dimensional mesoporous structure. First, 17.9 g of this organic template was dissolved in 561 g of deionized water along with 99.4 g of hydrochloric acid (Fisher). The mixture solution was stirred overnight at room temperature before adding a silica source, i.e., 39.6 g of tetraethyl orthosilicate (TEOS, Aldrich). After 5 minutes of vigorous stirring, the temperature of the precursor solution was elevated to 35° C. and maintained for 20 hours, producing a cloudy solution with a white precipitate. After subsequent heating at 80° C. for 24 hours, this solution was washed with deionized water and filtered to separate the precipitate. The resulting white solid was dried in an oven at 75° C. overnight before calcination. Calcination was performed by the following temperature protocol to remove the organic template: the sample was heated first to 200° C. at 1.2° C./min rate and held for 1 hour, then heated at the same ramp rate to 550° C. and held for 6 hours.

Aziridine was also synthesized by a previously reported method as a monomer for the synthesis of hyperbranched aminopolymers. A typical synthesis mixture was prepared by adding 34.5 g of 2-chloroethylamine hydrochloride (Aldrich) in an aqueous solution that comprises 34.1 g of potassium hydroxide (KOH, VWR) and 200 g of deionized water. After vigorous stirring at 50° C. for 2 hours, the solution was distilled under a partial static vacuum of 530 mm Hg to separate aziridine from water. Collected material was identified by $^1$H NMR (400 MHz, $D_2O$) and stored at 0° C. until being used in the hybrid material synthesis.

2.2. Preparation of the Adsorbents

As summarized in Table 1, various hybrid adsorbents were prepared as effective adsorbents for atmospheric $CO_2$ capture. Several hybrid adsorbents supported on mesoporous SBA-15 substrate (HAS) were prepared by known methods, utilizing different initial amounts of aziridine to control the amount of hyperbranched aminopolymer incorporated in the final product. For the labortatory scale synthesis of these tethered adsorbents, the desired amount (See Table 1, below) of aziridine was added to a dispersion containing 1.0 g of SBA-15 in anhydrous toluene (Acros). As shown in Table I, below, the HAS1~HAS6 samples were prepared containing different aminopolymer loadings in the final hybrid tethered amine adsorbents. Specifically, the HAS1~HAS6 samples were prepared by adding 0.13 g, 0.33 g, 0.53 g, 5.01 g, 2.03 g, and 2.65 g of aziridine per 1 g of SBA-15 silica, respectively. Polymerization of aziridine was carried out by the acid-catalyzed ring opening reaction that was initiated by adding a few drops of glacial acetic acid (Aldrich) to the suspension of the aziridiine and oxide. The mixture was reacted overnight at room temperature, with vigorous stirring at room temperature in a glass pressure vessel that sealed with a PTFE cap. The resulting solid product was collected by successive filtration and washing with copious additional amounts of toluene, and then dried overnight at 50° C. under vacuum before further characterization.

Tethering of the hyperbranched aminopolymer to form a Class (iii) adsorbent is also carried with other supports, including a polymer resin (HAP), preferably a hydrocarbon polymer, and other metal oxides (HAM), as listed above. For the synthesis of these hybrids, the experimental conditions described above were the same and only the support was changed.

For the polymer support, a commercial porous poly(styrene) resin with benzylamine functional groups (Aminomethylpolystyrene, pore size: 10 nm, particle size: 150-300 μm, from Varian, Inc.) was used as received. The HAP adsorbent is prepared by following a similar experimental procedure to that employed in the HAS synthesis.

In a generalized synthesis of these adsorbents, excessive amount of aziridine was employed to make the weight ratio of initial aziridine to support to be about 3.0. For instance, the HAP adsorbent was synthesized by adding 3.0 g of aziridine to 1 g of poly(styrene) resin dispersed in anhydrous toluene. Similarly, the HAM adsorbent was prepared using 3.0 g of aziridine and 1 g of iron oxide nanoparticles dispersed in anhydrous toluene. Approximately 4 drops of glacial acetic acid were added to each of these mixtures to catalyze the ring opening reaction of aziridine. The mixture was further reacted overnight at room temperature in a glass pressure vessel and then filtered and washed repeatedly with copious amounts of toluene. Finally, the resulting solid products were collected and dried overnight at 50° C. under vacuum before further characterization.

Also, nanoparticles of iron oxide (~2 nm particle size) were prepared separately as a representative metal oxide substrate, which in this case was nonporous, although a porous substrate is found to be preferred. Other metal oxides, both porous and nonporous, can also be used to prepare the Class (iii) tethered amine adsorbents, using the same preparation method as above used with the porous silica substrate.

A class (ii) supported amine sorbent was prepared, again on the laboratory scale, by reacting 3-(2-aminoethyl)aminopropyltrimethoxysilane (AEAPTMS, Aldrich), as the reagent, with SBA-15 nano particles. An excess of AEAPTMS, slightly over 2 g of the AEAPTMS, was added to 1.0 g of SBA-15 dispersed in anhydrous toluene, then stirred for 24 hours at room temperature under Ar atmosphere. The white product was filtered and washed with a copious amount of toluene, and then dried overnight at 50° C. under vacuum before further use. The resulting tethered amine sorbent had an organic:silica ratio of about 2:1. Again, other metal oxides, preferably those having surface hydroxyl groups, can also provide a tethered support by reacting with the silyl group. The exemplary Class (ii) tethered amine adsorbent is described below in Table 1.

Ar flow at a 100 ml/min rate and maintained at 110° C. for 3 hours. Thereafter, the material was allowed to cool to ambient conditions (25° C.) and held for 1 hour to stabilize the sample weight and temperature before introducing CO2-containing gas. The adsorption stage was initiated by exposing the samples to the dry target gas of desired concentration (i.e., 400 ppm CO2 or 10% CO2 balanced with Ar, respectively) at a flow rate of 100 ml/min until saturation of the weight increase or pseudo-equilibrium, i.e., by the time when there

TABLE 1

Reagents and reaction conditions for the Class (ii) and Class (iii) adsorbents used in the present invention.

| Adsorbent class | Sample name | Organic component | Support type | Organic to support ratio (w/w) | Solvent | Reaction period* | Reaction temperature |
|---|---|---|---|---|---|---|---|
| Class (ii) | DFS | AEAPTMS | SBA-15 | 3.00 | Toluene (anhydrous) | 24 hrs | 25° C. (R.T.) |
| Class (iii) | HAS1 | Aziridine | SBA-15 | 0.13 | Toluene (anhydrous) | 18 hrs | 25° C. (R.T.) |
| | HAS2 | Aziridine | SBA-15 | 0.33 | Toluene (anhydrous) | 18 hrs | 25° C. (R.T.) |
| | HAS3 | Aziridine | SBA-15 | 0.53 | Toluene (anhydrous) | 18 hrs | 25° C. (R.T.) |
| | HAS4 | Aziridine | SBA-15 | 5.01 | Toluene (anhydrous) | 18 hrs | 25° C. (R.T.) |
| | HAS5 | Aziridine | SBA-15 | 2.03 | Toluene (anhydrous) | 18 hrs | 25° C. (R.T.) |
| | HAS6 | Aziridine | SBA-15 | 2.65 | Toluene (anhydrous) | 18 hrs | 25° C. (R.T.) |
| | HAP | Aziridine | PS | 3.00 | Toluene (anhydrous) | 18 hrs | 25° C. (R.T.) |
| | HAM | Aziridine | Iron oxide | 3.00 | Toluene (anhydrous) | 18 hrs | 25° C. (R.T.) |

*18 hours denotes the overnight reaction.

2.3. Analyses of the Tethered Adsorbents

Hybrid adsorbents with different aminopolymer loadings were characterized by X-ray diffraction (XRD), transmission electron microscopy (TEM), $N_2$ physisorption, and thermogravimetric analysis (TGA). XRD patterns were obtained from a PANalytical X'Pert Pro powder X-ray diffractometer and a PW3011 proportional detector with a parallel plate collimator (CuK$\alpha$, $\lambda$=1.5418 Å). TEM images were obtained with a JEOL 100CX II transmission electron microscope operating at 100 kV. $N_2$ physisorption analyses were performed on a Micromeritics ASAP 2010 apparatus at 77 K to determine the pore characteristics such as the BET surface area, the pore volume, and the pore diameter. Prior to the measurement, the adsorbents were degassed by heating at 100° C. under vacuum for 24 hours. The pore diameter was calculated by Frenkel-Halsey-Hill modified Broekhof-de Boer (BdB-FHH) method. The aminopolymer contents were assessed by TGA measurements using a Netzsch STA409 from the weight loss between 200° C. and 700° C. About 20 mg of each of the samples were subjected to the continuous heating at a heating rate of 10° C./min from room temperature to 900° C. with air diluted by a nitrogen purge.

2.4. Performance Measurements of the Adsorbents

Figure 1:
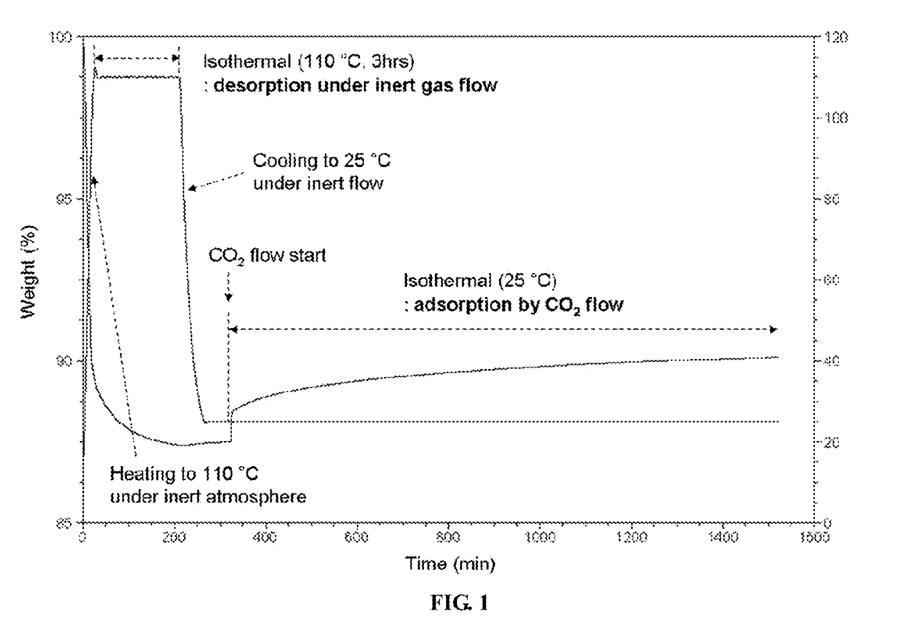
FIG. 1 Shows a typical temperature program used in the TGA-based $CO_2$ adsorption experiment.

The CO2 adsorption properties of the hybrid adsorbents were characterized using both a TA Q500 thermogravimetric analyzer and a Pfeiffer Vacuum QMS 200 Prisma Quadrupole Mass Spectrometer connected to a packed bed flow reactor, respectively. Typical adsorption experiments by TGA were conducted following the temperature protocols shown in FIG. 1. First, about 30 mg of the adsorbent was loaded in a platinum vessel and subjected to the desorption stage, in which the sample was heated to 110° C., by heating at 5° C./min under was no significant weight increase (less than 0.0001%/min). Adsorption capacities of the adsorbent were calculated from the sample weight changes observed during this period.

In a parallel track, the $CO_2$ adsorption capacities of the hybrid adsorbent were also investigated by analysis via mass spectrometry using humidified 400 ppm $CO_2$ sources. The detailed measurement procedure using this instrument has been reported elsewhere. The adsorption system was comprised of a Pfeiffer Vacuum QMS 200 Prisma Quadrupole Mass Spectrometer coupled with a packed bed flow reactor. In a typical adsorption experiment, about 60-80 mg of the adsorbent sample was diluted by mixing with ~300 mg sieved sand (250-425 micron) and loaded in a pyrex tubular reactor. The sand also provides for conducting heat generated during the reaction. Before each experiment, the samples were desorbed under the same conditions as in the TGA experiment, i.e., 110° C. for 3 hours under Ar flow. The adsorption step was initiated by flowing humidified 400 ppm $CO_2$ with the flow rate of 20 ml/min at atmospheric pressure and ambient temperature. The amount of $CO_2$ captured by the adsorbent was calculated by monitoring $CO_2$ concentration at the reactor outlet using the mass spectrometer.

Figure 2:
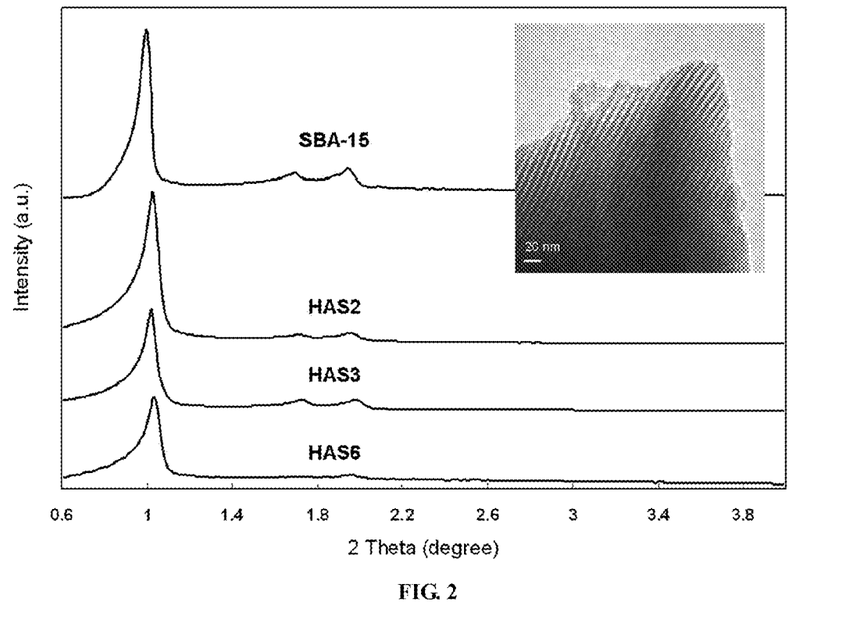
FIG. 2 Shows XRD patterns of the hybrid adsorbents with different aminopolymer loadings and the TEM image of SBA-15 mesoporous silica (inset)

RESULTS AND DISCUSSION 3.1 Characterization of the Exemplary Tethered Amine Adsorbents of the Present Invention The inorganic support employed in this work, SBA-15, was identified after its preparation by the X-ray diffraction and electron microscopy. FIG. 2 shows a TEM image of the prepared material involving one dimensional mesoporous channels with mean pore size approximately 6.5 nm, along with its XRD pattern. It also presents a series of diffraction patterns obtained from various hybrid adsorbents that incorporate different amounts of hyperbranched aminopolymers into, or onto, the substrates. The organic loading incorporated with each adsorbent was measured by TGA and the loadings are summarized in Table 2. The diffraction patterns of the pure SBA-15 samples displayed three characteristic peaks around 0.9, 1.5, and 1.8 within the 2θ ranges of 0.6~4.0 degrees, which can be indexed as (100), (110), and (200) planes, respectively. These peaks have been used as an indication of the hexagonal mesoporous structure of SBA-15.

Diffraction patterns of the hybrid adsorbents with different amine loadings were traced to identify the possibility of structural changes during aminopolymer integration into the pore space of the silica substrates. It is well known that the characteristic peak positions of mesoporous silica do not show significant differences even after incorporating typical organic substances by covalent immobilization of silane coupling agents or physical loading of amines via impregnation, while the intensity of the characteristic peaks decreases after the organic components are loaded. Consistent with the previous reports, the XRD patterns of pure SBA-15 and the hybrid materials did not show significant differences in the peak positions, although a different incorporation mechanism, i.e., hyperbranching polymerization of monomer units, was employed in this work. This result suggests that the long-range ordered structure of SBA-15 was not affected by the incorporation of the hyperbranched aminopolymers. On the other hand, it was observed that the intensity of the low-angle reflection peak decreased after aminopolymer immobilization. The series of the XRD patterns in FIG. 2 shows that the (100) peak intensities were reduced along with an increase of aminopolymer loading, suggesting the effects from the hyperbranched aminopolymer occupation in the SBA-15. It is unclear from this result where the aminopolymers are located because SBA-15 has two different types of surfaces for functionalization, i.e., the pore walls and the outer particle surface. On the other hand, it has been reported by Xu et al. that the poly(ethyleneimine) (PEI) coating on the outer surface of MCM-41 crystals did not make significant changes on the diffraction intensity of the characteristic peaks.[13] This result suggests that the hyperbranched polymers are not grown exclusively at the particle outer surface of SBA-15, and that at least a portion of the polymers are integrated into the mesoporous channels.

Figure 3:
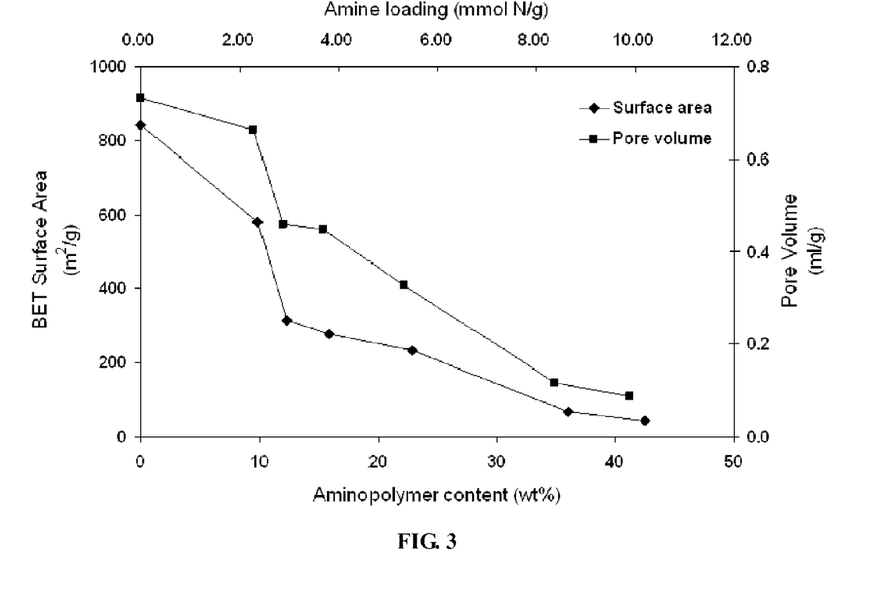
FIG. 3 Shows XRD patterns of the hybrid adsorbents with different aminopolymer loadings and the TEM image of SBA-15 mesoporous silica (inset)

Nitrogen physisorption data were employed to identify the porosity characteristics of the SBA-15 supported adsorbents with different aminopolymer loadings, including the surface area, pore volume, and pore diameter. FIG. 3 illustrates the changes of the surface area and pore volume as the aminopolymer loadings change. Both properties show a similar behavior, i.e., presenting a gradual decrease of both surface area and pore volume as the organic content increases. Unfunctionalized SBA-15 mesoporous silicas used in this experiment had an average surface area and pore volume of 858 $m^2$/g and 0.80 ml/g on average, respectively. On the other hand, even with a loading of only 9.9 wt % of aminopolymer (HAS1), both characteristics displayed substantial decreases to 579 $m^2$/g and 0.66 ml/g. As the polymer loading was increased, the surface area and pore volumes were reduced further. For example, HAS6 showed only 45 $m^2$/g of surface area and 0.09 ml/g of the pore volume. The changes in the surface area and pore volume suggest that, as also reflected by the XRD characterization results, at least a portion of organic moieties occupy the pore space of the SBA-15 support.

TABLE 2

Hybrid adsorbents incorporating different amounts of aminopolymers onto the SBA-15 support.

| Sample name | Organic contents (wt %) | Amine loading (mmol/g) | BET Surface area ($m^2$/g) | Pore volume (cc/g) |
|---|---|---|---|---|
| SBA | 0 | 0.0 | 858 | 0.80 |
| HAS1 | 9.9 | 2.27 | 579 | 0.69 |
| HAS2 | 12.3 | 2.84 | 314 | 0.51 |
| HAS3 | 15.9 | 3.65 | 278 | 0.49 |
| HAS4 | 22.9 | 5.27 | 234 | 0.39 |
| HAS5 | 36.1 | 8.30 | 71 | 0.15 |
| HAS6 | 42.5 | 9.78 | 45 | 0.11 |

The organic mass was identified from TGA measurements, while the BET surface area and pore volume data were obtained from $N_2$ physisorption.

Figure 4:
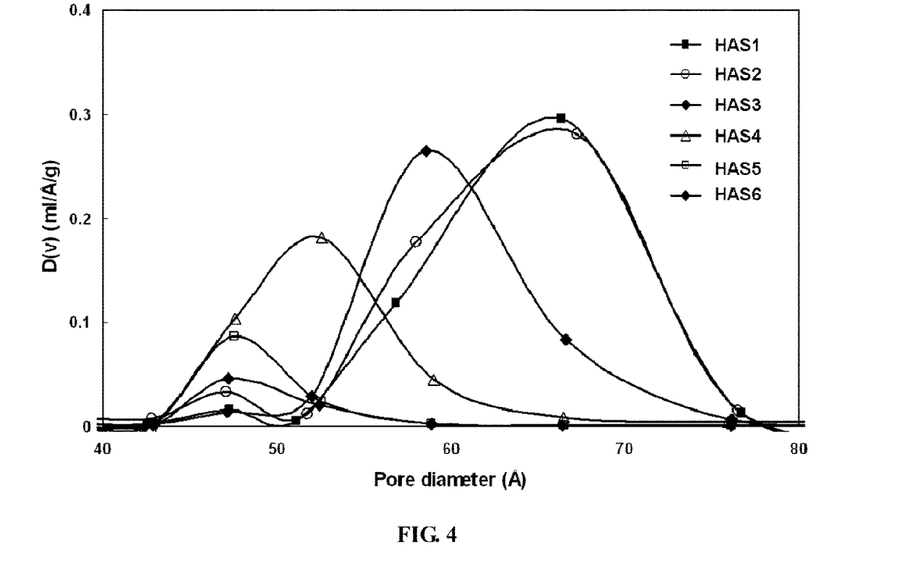
FIG. 4. Shows the pore size distribution of the HAS hybrid adsorbents calculated by Frenkel-Halsey-Hill modified Broekhof-de Boer (BdB-FHH) method, in which the adsorbents involves different amount of hyperbranched aminopolymers supported on SBA-15.

On the other hand, the pore diameters of these samples exhibited dissimilar behavior with those of conventional functionalized solids, as shown in FIG. 4 in terms of the pore size distributions. The pore diameter of the samples was estimated using the Frenkel-Halsey-Hill modified Broekhof-de Boer (BdB-FHH) method. The average pore diameter of pristine SBA-15 supports was measured to be ca. ~61 Å, and this value is decreased after the organics were loaded. For example, by incorporating 22.9 wt % of the aminopolymer (HAS3), the pore diameter was substantially reduced to ~52 Å. Interestingly it seems that the pore size of the hybrid adsorbents has a lower bound at a specific amine loading, above which loading, significant reduction of the pore diameter is not observed. For example, the pore diameter decreases from ~52 Å to 47 Å as the organic content increased from 22.9 wt % to 36.1 wt %, while there was no discernible size change if the organics were further increased to 42.5 wt %. This result is very different from what is observed in typical mesoporous materials incorporating a monolayer of organic functionalities by silane functionalization, in which the pore diameter shows similar trend with the surface area and pore volume in most cases.

Although having no impact on the scope and definition of the present invention, One possible rationalization of these data may be found in considering the differences in the organic species tethered to the substrate. In typical processes of hybrid aminosilica preparation on porous substrates, pre-synthesized molecules are introduced into the support by impregnation or grafting (forming covalent bonds) but there is no intermolecular reactions between the organic components (in the absence of silane cross-linking in the latter case). On the other hand, in the preparation of HAS materials, organic functionalities are not pre-defined but are built up from the aziridine monomers by successive ring opening reactions.

It has been reported that the ring opening is an acid-catalyzed process, and the loading of aminopolymers in the hybrid is determined in part by the mass of aziridine added initially. Once the ring opening of an aziridine molecule is initiated on the surface silanol groups that are present on both the pore channels and outer surface of the support structure, the resulting amine species can be another reactive site for the next ring opening reaction. Subsequent aziridine molecules facilitate the growth of aminopolymers either on the particle surface and/or pore walls as long as the accessibility of aziridine to the latter sites is not disturbed significantly. A trend of the pore distributions in FIG. 4 suggests that molecular transport of aziridine (relative to the rate of ring-opening polymerization) through the pore channels may be restricted when the pore size reaches a critical dimension, e.g., ~50 Å.

In the adsorbents with relatively low amine loadings (i.e., those prepared with relatively small amount of initial aziridine like HAS1~HAS4), growth of the aminopolymers may be able to occur on the outer surface as well as the pore walls without considerable restraint, so that the average pore diameter decreases as the organic content increases. As the pore narrowed to a critical diameter, the rate of the ring-opening reaction may compete with the rate of diffusion and excessive aziridine molecules in the high loading adsorbents like HAS5 and HAS6 may react preferentially with the outer surface or pore mouth reactive sites. As a result, further growth of aminopolymers may occur at the outer surface of SBA-15 predominantly. This suggests that there may be an optimum amount of initial aziridine, over which excessive aziridine will cause a "pile-up" of aminopolymers outside the pores. This is consistent with the data shown in FIG. 4, whereby the average pore diameter is reduced to ~50 Å, at which point the average pore diameter does not decrease but the total pore volume is reduced, as pores are filled or blocked. Although the exact configuration of the hyperbranched aminopolymers incorporated in this mesoporous silica is not known, this is not necessary to understanding the scope and effect of the present invention.

3.2. Adsorption Performance of the Adsorbents 3.2.1. Effect of $CO_2$ Concentration The effect of the $CO_2$ concentration on the $CO_2$ adsorption performance of the hybrid adsorbents was investigated by exposing an adsorbent to two different feed gases, i.e., moderately concentrated and diluted $CO_2$, respectively. It has been known that the $CO_2$ concentration leads to the changes in adsorption characteristics such as adsorption kinetics and adsorption capacity. For instance, Zhang et al. reported that the $CO_2$ adsorption rate on immobilized amines was influenced by the $CO_2$ concentration. Belmabkhout et al. showed that the equilibrium $CO_2$ adsorption capacity of a pore-expanded MCM-41 modified by triamine decreased from 2.05 mmol $CO_2$/g adsorbent (hereafter, presented in the form of mmol/g) to 1.20 mmol/g by changing the feed stream from 5% $CO_2$ in $N_2$ to 1000 ppm $CO_2$ in He.

Figure 5:
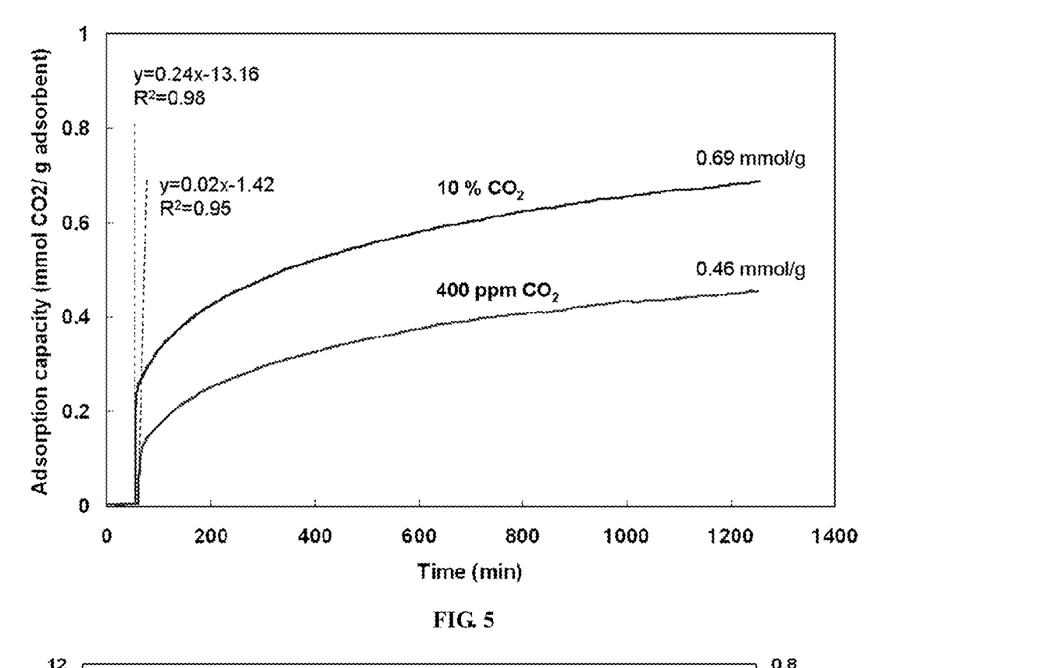
FIG. 5. Shows the comparison of the $CO_2$ adsorption capacities and kinetics of the HAS6 sample measured by a TGA instrument during 20 hours using concentrated (10%) and diluted (400 ppm) dry CO2 sources balanced with Ar, respectively.

FIG. 5 illustrates the adsorption curves of a hybrid adsorbent (HAS6) from the adsorption performance measurements carried out by a TGA instrument at 25° C., using 10% and 400 ppm dry $CO_2$ sources that were balanced with Ar, respectively. In these experiments, the adsorption capacities were compared to each other by the amounts of adsorbed $CO_2$ after 20 hours of adsorption, while the $CO_2$ adsorption kinetics were compared in terms of the maximum adsorption rate that corresponds to the linear part of the adsorption curve. The results shows that, as expected, the $CO_2$ adsorption capacities of the hybrid adsorbent for a given time reveal differences according to the feed $CO_2$ concentration. When the adsorbent was allowed to adsorb $CO_2$ for 20 hours, its adsorption capacity from 10% $CO_2$ was ~0.69 mmol/g, while that from 400 ppm $CO_2$ corresponded to ~0.46 mmol/g. On the other hand, it is noteworthy that the difference in $CO_2$ adsorption capacity is relatively small compared to difference in feed gas $CO_2$ concentration. In an aforementioned work of Belmabkhout et al., the $CO_2$ adsorption capacity was reduced by a factor of 0.5 although the $CO_2$ was diluted by a factor of 50. In the present work, whereas the $CO_2$ concentration is decreased by a factor of 250, the adsorption capacity of 400 ppm $CO_2$ is only marginally lowered than that of 10% $CO_2$, i.e., by a factor of 0.62.

The feed $CO_2$ concentration was found to influence the $CO_2$ adsorption kinetics as well, where the adsorption kinetics is expressed in terms of the maximum $CO_2$ uptake rate measured at the initial stage of the adsorption experiments. For this purpose, the slope of the adsorption curve was calculated in its linear part that corresponds to ~60 seconds of adsorption. The results show that the adsorption rate of this hybrid adsorbent is faster using the concentrated $CO_2$ feed. For example, the maximum $CO_2$ adsorption rate of the adsorbent reaches 0.24 mmol/g*min under the 10% $CO_2$ conditions, being comparable to that of a 3-aminopropyl functionalized SBA-12 tested with a gas mixture of 10% $CO_2$ and 90% $N_2$. On the other hand, when $CO_2$ at 400 ppm concentration was applied, the $CO_2$ adsorption rate was reduced to ~0.02 mmol/g*min. However, it should be considered that, like the changes observed in the adsorption capacities, the adsorption kinetics varied in a relatively small degree compared to the 250 fold variation in the $CO_2$ concentration.

It should be noted from these experiments that the hybrid adsorbents present effective adsorption performance even from diluted gas sources similar to those found in ambient air. The experiments show that, although reduced and slower to some extent, the adsorption capacity and kinetics of this adsorbent are not reduced equivalently, i.e., by a factor of 10 instead of a factor of 250, i.e., the huge $CO_2$ feed concentration decrease. Instead, the adsorbent can still effectively capture considerable amounts of $CO_2$ at an adequate adsorption rate from a gas mixture simulating the ambient air.

3.2.2. Effect of Amine Type

Figure 6:
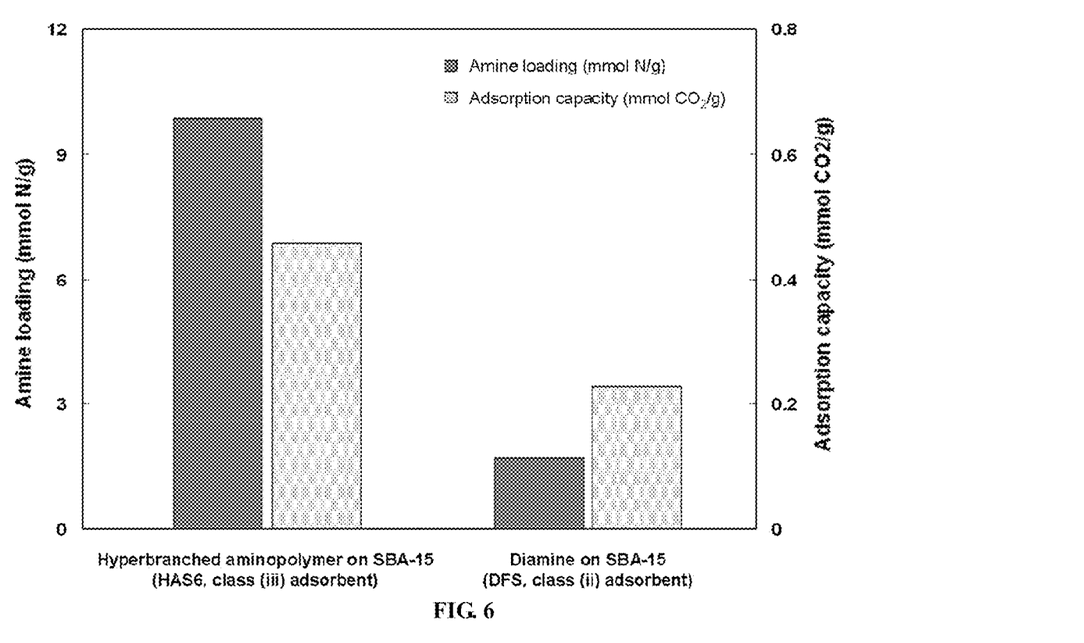
FIG. 6 Shows the comparison of the atmospheric $CO_2$ adsorption capacities of different adsorbents including the hyperbranched aminopolymer-containing HAS6, and the diamine-containing material, respectively, in which the adsorption capacity was obtained from the weight gains after 24 hours of TGA measurement using dry 400 ppm $CO_2$ at ambient temperature. Comparison of the atmospheric $CO_2$ adsorption capacities of different adsorbents including the hyperbranched aminopolymer-containing HAS6, and the diamine-containing material, respectively, in which the adsorption capacity was obtained from the weight gains after 24 hours of TGA measurement using dry 400 ppm $CO_2$ at ambient temperature.

To compare the effectiveness of different hyperbranched aminopolymers as an atmospheric $CO_2$ adsorbing species, two different adsorbent materials were prepared and compared in terms of the $CO_2$ adsorption capacities that were obtained from 24 hours of the TGA measurements using dry 400 ppm $CO_2$ at ambient temperature. Specifically, the $CO_2$ adsorption capacity and the amine loading of a class (iii) sorbent, based on SBA-15 containing covalently bound hyperbranched aminopolymer (HAS6), and a Class (ii) adsorbent, based on N-(3-(trimethoxysilyl)propyl)ethane-1,2-diamine (AEAPTMS) functionalized SBA-15 (DFS), were compared and the results are shown in FIG. 6. The organic contents in these adsorbents were controlled to have their maximum quantities, so that the $CO_2$ adsorption capacities observed can be thought to approximate the highest adsorption capacity of each adsorbent type. The $CO_2$ adsorption capacities decreased in the order of HAS6>DFS, in which the capacity was 0.46 mmol/g, and 0.23 mmol/g, respectively. Considering that the amine loading on the two adsorbents shows a similar trend in the same order, the difference in the adsorption capacities seems to be attributed to the number of the $CO_2$ binding sites (the amount of amines) in the adsorbents.

3.2.3. Effect of Amine Loading

The influence of aminopolymer loading on the $CO_2$ adsorption performance of the hybrid adsorbents was evaluated by tracing the weight changes with a TGA instrument and monitoring the effluent gas with a mass spectrometer. Specifically, the equilibrium adsorption capacities of the adsorbents with varying organic loadings were obtained from a mass spectrometer using humidified $CO_2$ sources, while the kinetic properties such as the adsorption rate and adsorption half times were investigated by a TGA apparatus using dry 400 ppm $CO_2$. The TGA adsorption curves also allow qualitative comparison of the pseudo-equilibrium capacities of different adsorbents, but it was not used to compare equilibrium capacities of the adsorbents because the time to reach true equilibrium is too long in practical experimental protocols of TGA.

Figure 7:
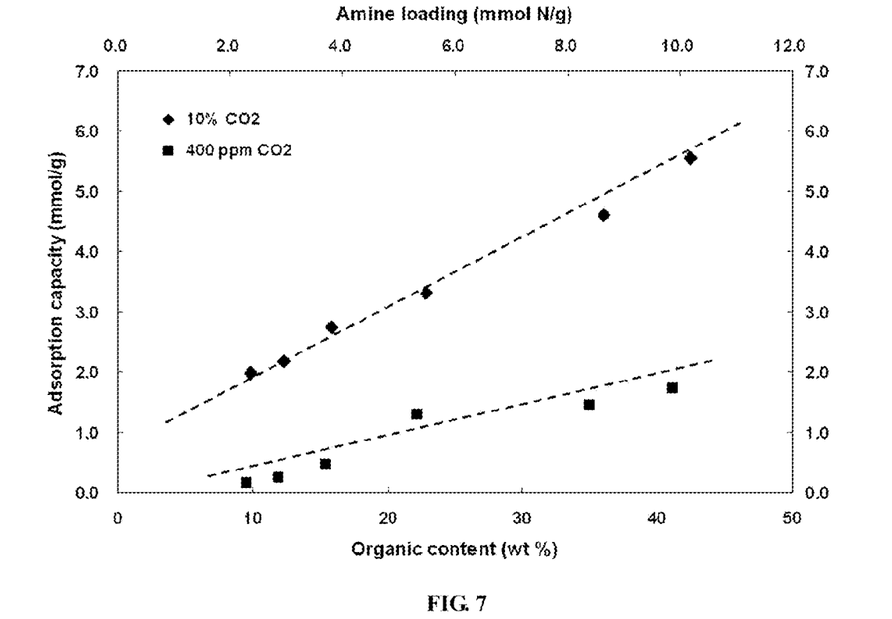
FIG. 7. Comparison of the equilibrium adsorption capacities measured by the fixed bed system at a room temperature for the HAS hyperbranched aminopolymer adsorbents at 400 ppm and 10% $CO_2$ measurements under humid conditions, respectively.

The relationship between the organic loading and the adsorption capacity was investigated using a mass spectrometer by tracking the equilibrium adsorption capacities of the different adsorbents, as summarized in Table 3 and FIG. 7. In these experiments, the $CO_2$ adsorption capacity was tested at the ambient temperature using 10% and 400 ppm humidified $CO_2$ sources, respectively, for each of the adsorbent samples with different organic content. The data from the systematic adsorption experiments, using the fixed bed flow system coupled with the mass spectrometer, revealed that the equilibrium capacity of the hybrid adsorbents at 400 ppm $CO_2$ concentration can be correlated almost linearly with the amine loading. For example, the amount of adsorbed $CO_2$ increases from 0.16 mmol/g to 1.44 mmol/g as the organic content was elevated from 9.9 wt % (HAS1) to 36.1 wt % (HAS5). The highest $CO_2$ adsorption capacity was observed in the HAS6 sample, which involved the highest amine loading (42.5 wt %), as shown in Table 3. The effect of amine loading on the $CO_2$ capture capacity showed a similar trend when the gas source was concentrated to 10%, while displaying almost a linear relationship between the organic contents and adsorption capacities (FIG. 7).

Apparently, the degree of capacity loss due to the dilution of the $CO_2$ feed was more pronounced at lower amine loadings. For example, the 400 ppm $CO_2$ adsorption capacity of HAS6 corresponded to ~31% of the 10% $CO_2$ adsorption capacity, while the capture capacity of HAS1 from 400 ppm $CO_2$ sources was only ~8% of that from the 10% $CO_2$ mixture. Accordingly, the adsorbents with high amine loading are preferred over those with low loadings, especially for the $CO_2$ capture applications with ambient air.

TABLE 3

Equilibrium adsorption capacities of the HAS hybrid adsorbents with different amine loadings.

| Sample name | Organic contents (wt %) | Amine loading (mmol/g) | 400 ppm $CO_2$ capacity (mmol/g) | 10% $CO_2$ capacity (mmol/g) | 400 ppm and 10% $CO_2$ capacity ratio (%) |
|---|---|---|---|---|---|
| HAS1 | 9.9 | 2.27 | 0.16 | 1.98 | 8.1 |
| HAS2 | 12.3 | 2.84 | 0.25 | 2.17 | 11.5 |
| HAS3 | 15.9 | 3.65 | 0.46 | 2.75 | 16.7 |
| HAS4 | 22.9 | 5.27 | 1.29 | 3.31 | 39.0 |
| HAS5 | 36.1 | 8.30 | 1.44 | 4.60 | 31.3 |
| HAS6 | 42.5 | 9.78 | 1.72 | 5.55 | 31.0 |

Each adsorbent was tested using the fixed bed flow system coupled with mass spectrometer at the ambient temperature using 10% and 400 ppm $CO_2$ humidified mixtures balanced with Ar, respectively.

Figure 8:
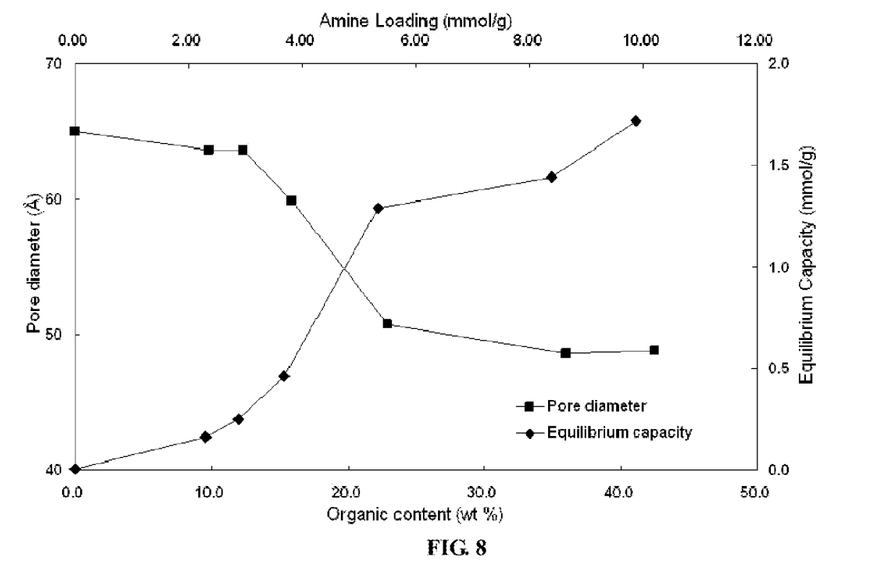
FIG. 8. Effect of the quantities of the hyperbranched aminopolymer in the HAS adsorbents on the pore diameter and the equilibrium adsorption capacity that was obtained from the room-temperature 400 ppm $CO_2$ capture tests using the fixed bed apparatus.

Although an increase of the amine loading in the hybrid adsorbent makes it feasible to enhance $CO_2$ capture at 400 ppm concentration, it may be also accompanied by changes in the hybrid structure and porosity as described in the section 3.1. FIG. 8 depicts the equilibrium adsorption capacities as well as the pore diameters of various adsorbents, as a function of the amine loading. With increasing amine loading, the adsorption capacity and the pore diameter behave oppositely: as the pore size decreased, the adsorption capacity increased. Presumably, these changes were related to the configuration of the hyperbranched aminopolymers that caused pore wall functionalization in the SBA-15 channels.

The pore diameter does not show noticeable changes until the amine loading is less than ~12.3 wt % (HAS2), but decreases in the range of amine loading between 12.3 wt % and 22.9 wt % (HAS4). When the amine loading is higher than this, the changes in the pore diameter become insignificant again. Similarly, the equilibrium adsorption capacity of the hybrid adsorbents from humidified 400 ppm $CO_2$ exhibits a steep increase in association with the amine loading increase in the range of 12.3 wt % (HAS4) and 22.9 wt % (HAS5). The equilibrium adsorption capacity continued to increase when the amine loading was over 22.9 wt %, but the degree of change became less prominent. For example, along with a ~10 wt % increase in amine loading, the adsorption capacity of HAS5 (1.29 mmol/g) was improved approximately by a factor of six from that of HAS4 (0.25 mmol/g) at the 400 ppm concentration. On the other hand, in spite of similar changes in amine loading between HAS5 and HAS6, the adsorption capacity of HAS6 (1.44 mmol/g) increased only by 11% from that of HAS5 (1.29 mmol/g).

This result suggests that, in combination with the discussions in the section 3.1., there exist some differences in the configuration of the hyperbranched aminopolymers. When the amine loading is lower than ~25 wt % (e.g., HAS4), further addition of aziridine monomer may facilitate its immobilization on the pore surface, resulting in a sharp decrease in the pore diameter as well as a considerable improvement in the adsorption capacity. On the other hand, if more than 25 wt % of amines is present, excessive aminopolymers may be populated onto the outer surface of SBA-15 crystals and thus both the pore diameter and adsorption capacity do not show the same substantial changes with further addition of amines. Based on these results, a preferred composition of the hyperbranched aminopolymers may be around 25 wt % of the total hybrid when using this solution synthesis method. Above that proportion, additional incorporation of the organic components does not make as significant a contribution to the adsorbent performance.

Figure 9:
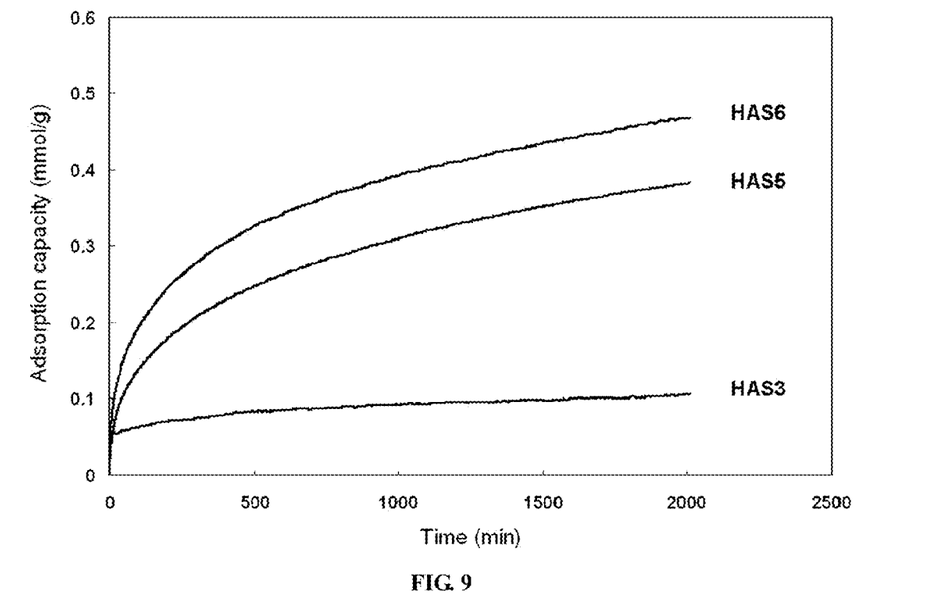
FIG. 9. Typical atmospheric $CO_2$ adsorption uptake curves of the hybrid adsorbents involving different amounts of the hyperbranched aminopolymers, from the systematic measurements by TGA at 25° C. under the 400 ppm dry $CO_2$ flow.

The effect of amine loading on the adsorbent performance was also evaluated by comparing the results from TGA adsorption experiments, especially in terms of the adsorbent kinetics including the adsorption rate and the adsorption half time. FIG. 9 shows the typical $CO_2$ adsorption uptake curves from TGA testing of the adsorbents that incorporate different amounts of hyperbranched aminopolymers onto the SBA-15 support. Before the measurements, the samples were activated by heating at 110° C. for 3 hours, and then cooled down to 25° C. in the Ar atmosphere. Under the isothermal condition at this ambient temperature, experiments were initiated by flowing dry 400 ppm $CO_2$ at the rate of 100 ml/min. Upon introduction of the target gas, the hybrid adsorbents exhibited a rapid weight gain that corresponds to the $CO_2$ captured by amine moieties on the hyperbranched aminopolymer. This fast $CO_2$ uptake was observed during a specific time for each sample, usually on the order of several tens of minutes, followed by a slower adsorption stage until the measurement was stopped. The adsorption rate was calculated from the linear part of the 400 ppm $CO_2$ adsorption curve obtained from TGA. The adsorption half time of each adsorbent was determined by measuring the time required to achieve the pseudo-equilibrium capacity over which no significant weight gains were identified (less than 0.0001%/min). Both values are also summarized for each HAS adsorbent in Table 4 and FIG. 10.

Figure 10:
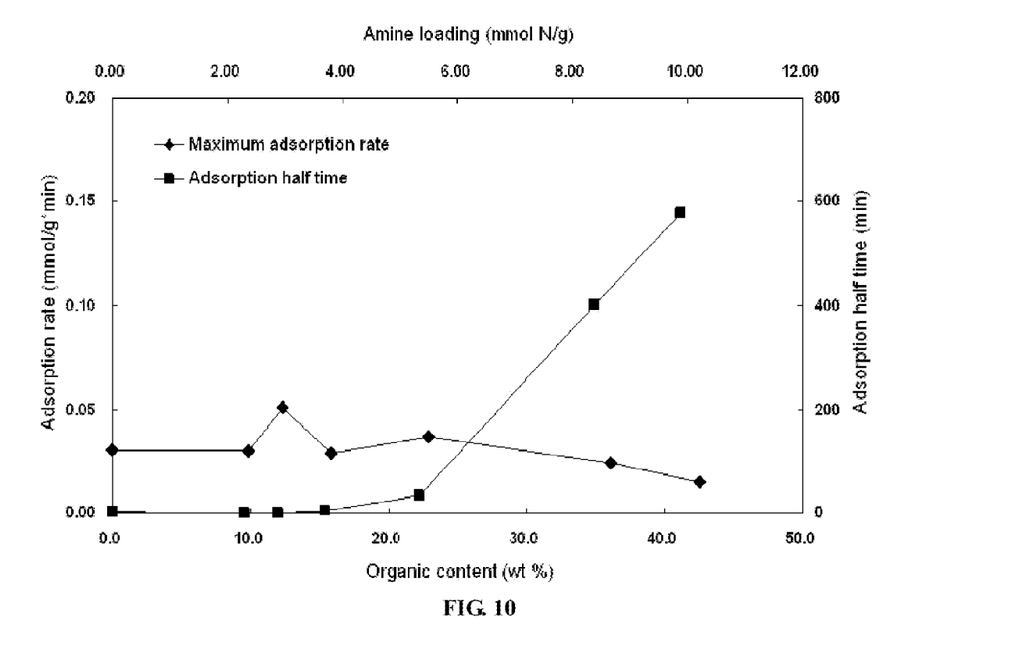
FIG. 10. Changes of the $CO_2$ adsorption rate and the adsorption half times as a function of the amine contents in the HAS hybrid adsorbents. Adsorption rate was calculated from the linear part of the 400 ppm $CO_2$ adsorption curves obtained from TGA, while the adsorption half time was decided as the time required to reach the pseudo-equilibrium capacity in the TGA adsorption experiments using dry 400 ppm $CO_2$ source.

The results illustrate that both the adsorption rate and adsorption half time of the hybrid adsorbents may be related to the loading of hyperbranched aminopolymers incorporated with the substrate. Although the adsorption rate of the adsorbents does not show as strong a dependence on the amine loading as the adsorption capacity, it still possesses an inflection point where the adsorption rate starts to decrease. Like the trend seen with the pore diameter and the adsorption capacity, the $CO_2$ uptake rate exhibits a change when the amine loading becomes higher than ~25 wt %. For example, the uptake rate for 400 ppm $CO_2$ was maintained around 0.030 mmol/g*min when the amine loading is below 22.9 wt % (HAS4). However, over this composition, the $CO_2$ adsorption slowed down and finally reached ~0.015 mmol/g*min in the case of HAS6 (42.5 wt % amine loading). The results from these experiments also demonstrate that the adsorption half times of the hybrid adsorbents show similar behavior to the adsorption rates. Specifically, the adsorption half times exhibited an abrupt increase when the amine loading became higher than 22.9 wt % (HAS4). For example, as the amine content increased from 22.9 wt % (HAS4) to 36.1 wt % (HAS5), the adsorption half time increased more than by a factor or ten, i.e., from ~30 minutes to ~400 minutes. These observations indicate that there exists an optimum configuration of the hybrid adsorbent with respect to adsorption half time.

Each of the HAS adsorbents was tested using the TGA instrument at ambient temperature using dry 400 ppm $CO_2$ mixture balanced with Ar. The adsorption half time was determined by measuring the time required to achieve the pseudo-equilibrium capacity over which no significant weight gains were identified (less than 0.0001%/min) on the TGA, while the maximum adsorption rate was calculated from the linear part of the 400 ppm $CO_2$ adsorption curve obtained from TGA. The results are shown in Table 4.

TABLE 4

Adsorption half times and maximum adsorption rates of the HAS adsorbents with different amine loadings.

| Sample name | Organic contents (wt %) | Amine loading (mmol/g) | Adsorption half time (min) | Adsorption rate (mmol/g*min) |
|---|---|---|---|---|
| HAS1 | 9.9 | 2.27 | 0.9 | 0.030 |
| HAS2 | 12.3 | 2.84 | 0.9 | 0.051 |
| HAS3 | 15.9 | 3.65 | 4.1 | 0.029 |
| HAS4 | 22.9 | 5.27 | 32.6 | 0.037 |
| HAS5 | 36.1 | 8.30 | 400.7 | 0.024 |
| HAS6 | 42.5 | 9.78 | 577.7 | 0.015 |

On the whole, it can be said that the loading of hyperbranched aminopolymers affects the adsorption performance of the hybrid adsorbents in terms of both the adsorption capacity and the adsorption kinetics. The results from the systematic experiments also indicate that for these adsorbents, the preferred amine loading is ~25 wt %, when using this synthetic method. The adsorption capacity over this composition shows a slight increase even with higher organic loadings and the contribution of added aminopolymer to the overall adsorption capacity becomes less pronounced. It was also observed that there was an inflection point at this configuration in the plot of pore dimension, over which the reduction of pore diameter becomes less prominent even with further increase of amine loadings. These findings suggest that the addition of aminopolymers over this concentration are likely to be preferentially tethered outside of the pores; as the pores go below the critical dimension, it apparently prevents inner-pore hyperbranching while successively closing the pores in the order they reached the critical size. Changes to the pore size characteristics also may be related to changes in the adsorption kinetics of this hybrid, as observed in the trends of the adsorption rate and adsorption half times. This suggests that this type of tethered adsorbent can be easily controlled by changing the initial amount of aziridine or by using an alternate synthesis, such as a vapor-phase synthesis. It is thus considered that this type of hybrid integrates hyperbranched aminopolymers in the porous support in a way that the adsorption capacity and kinetics can be fine-tuned to provide a highly cost-effective medium for atmospheric $CO_2$ capture.

3.2.4. Effect of Substrates

Figure 11:
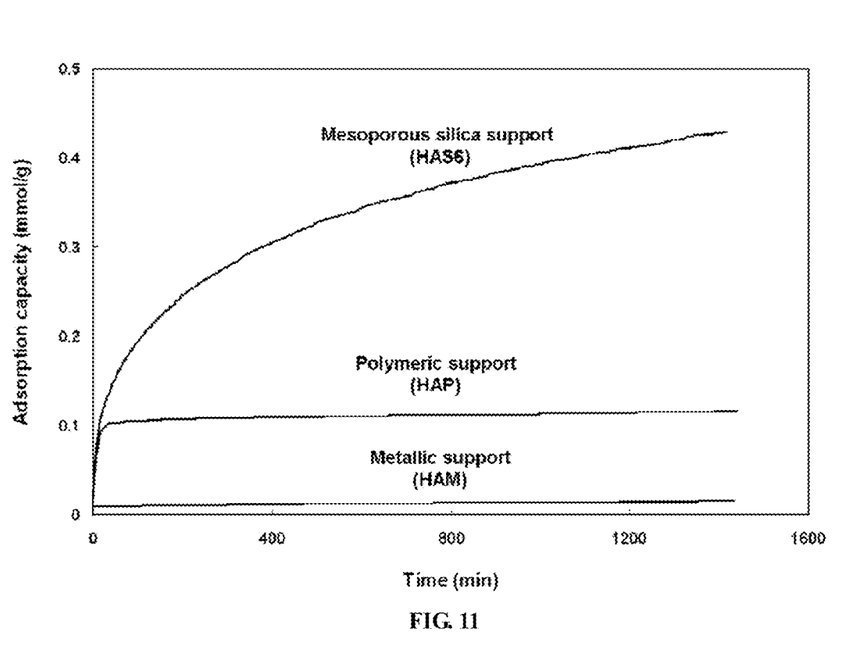
FIG. 11. Comparison of the 400 ppm $CO_2$ adsorption curves of the hyperbranched aminopolymer adsorbents supported on different substrate, including mesoporous silica SBA-15, commercial benzylamino-functionalized poly(styrene) porous resin, and iron oxide particles, in which the $CO_2$ adsorption experiments were performed by a TGA instrument at ambient temperature for 24 hours using dry 400 ppm $CO_2$.

The influence of the substrate support on the atmospheric $CO_2$ adsorption performance was evaluated by comparing the adsorption curves of the hyperbranched aminopolymer adsorbents supported by three different substrates: a mesoporous silica (HAS6), a hydrocarbon polymer (HAP), and a metal oxide (HAM). As mentioned in the section 2.2., commercial porous poly(styrene) resin with benzylamine surface functional groups was used as received as a polymer supported HAP adsorbent; a nonporous iron oxide nanoparticle (~2 nm particle size) support and SBA-15 mesoporous silica were used for the HAM and HAS6 sample, respectively. These adsorbents were prepared by the typical experimental procedure described in the section 2.2., in which the ratio of initial aziridine and support was controlled around 3.0. These adsorbents were tested by TGA apparatus flowing 400 ppm $CO_2$ at 100 ml/min rate and their adsorption curves during 24 hours of adsorption were compared as illustrated in FIG. 11. The adsorption curves of these adsorbents illustrate that, although their adsorption capacities were varied, all of these hybrid adsorbents show an ability to capture $CO_2$ from a gas containing 400 ppm $CO_2$ at ambient temperature. However, the effectiveness of $CO_2$ capture capacity of the hybrids decreased in the order of mesoporous silica support (HAS6), polymeric support (HAP), and metal oxide support (HAM), in which the adsorption capacity of the SBA-15 supported adsorbent was much higher than those from the polymeric and metal oxide substrates. Also, examination of the adsorption curves revealed that $CO_2$ adsorption from the 400 ppm $CO_2$-gas mixture by the HAP and HAM samples reached equilibrium after ~1 hour, while that of HAS6 was not completed even after 24 hours of adsorption.

Differences in the adsorption curves of these adsorbents suggests a considerable effect of the substrate component on the $CO_2$ adsorption properties of the hyperbranched aminopolymer hybrids, which may be attributed to the characteristics of the substrate material such as the surface functional groups and the pore structure. For example, it can be thought that the surface reactive sites on the polymeric support may not be sufficient in number to accommodate enough aminopolymer or it may have less affinity for aziridine, although it should offer ample pore space (up to 10 nm in size, as reported by the manufacturer) to allow the inclusion of aziridine molecules. On the other hand, the lower adsorption capacity in the nonporous metal oxide-supported adsorbent seems to be related to the nonporous nature of the material. For instance, surface area of the metal oxide particles was measured as ~66 $m^2/g$, which was significantly lower than that of the SBA-15 (~840 $m^2/g$). Since the particles are nonporous, they cannot accommodate a sufficient number of hyperbranched aminopolymers. For instance, although a similar ratio of initial aziridine to support was employed for sample preparation, the amount of organics in the HAS6, HAP, and HAM samples were substantially different, i.e., about 42.5 wt %, 17.1 wt %, and 7.3 wt %, respectively. However, in spite of the variation in the adsorption capacities, the hyperbranched aminopolymers are considered to be able to function as an effective $CO_2$ binding species irrespective of the substrates to which they are tethered, but the effectiveness to capture atmospheric $CO_2$ is dependant, to at least a certain extent, on the nature of the substrate.

3.2.5 Effect of Adsorbent Regeneration

Figure 12:
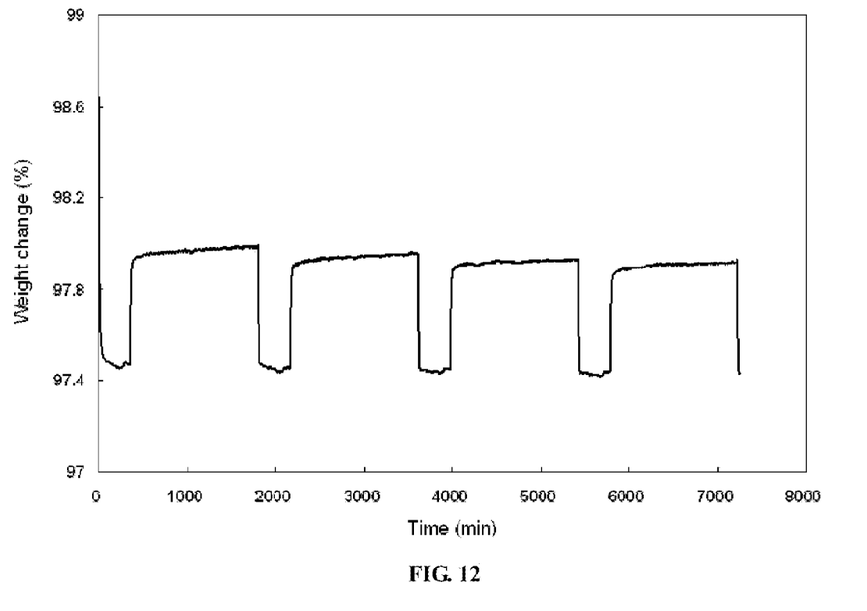
FIG. 12. Multicycle TGA adsorption curves of the hybrid adsorbent incorporating aminopolymers onto the polymeric support (HAP), in which adsorption and desorption cycles were repeated four times. Adsorption via TGA measurement was carried out using dry 400 ppm $CO_2$ at room temperature'
Figure 13:
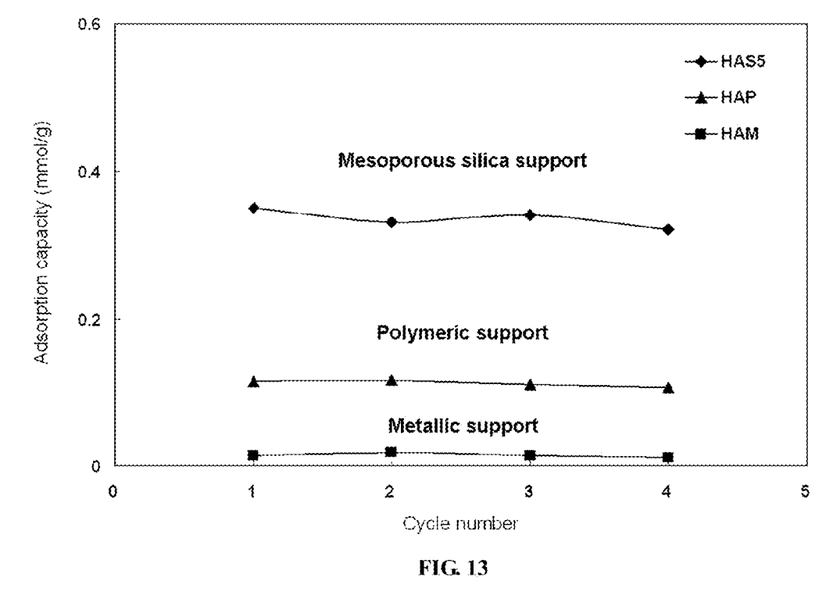
FIG. 13. Changes of the adsorption capacities of different hybrid adsorbents in a function of the adsorption/desorption cycles. Multicycle adsorption performance of the adsorbents was evaluated by TGA using dry 400 ppm $CO_2$ at ambient temperature.

The adsorbent durability during the cycles of regeneration is critical to the practical value of any tethered sorbent. Such a product should display a relatively stable adsorption performance during a prolonged cyclic operation. FIG. 12 shows the adsorption capacity of the hyperbranched aminopolymers incorporated in the polymeric support (HAP) measured during recurring cycles of 400 ppm $CO_2$ adsorption at 25° C. and desorption under Ar flow at 110° C. The adsorption curve illustrates that the adsorptive performance of this adsorbent is fairly stable, showing only a slight decrease in the adsorption capacities after four adsorption/desorption cycles. This result suggests that, in terms of its regenerability, the hyperbranched aminopolymer on a polymeric support can be a promising adsorbent for atmospheric $CO_2$ capture and it can maintain its initial adsorption capacity without significant degradation during repetitive use at ambient operating conditions. Samples of HAS5, HAP, and HAM were tested and did not show significant reduction in adsorption capacities after four operating cycles. It is believed that because the hyperbranched polymers are anchored to the substrates, by means of covalent bonding, their stability is enough to allow repeated temperature swing cycles, without a significant loss of the active $CO_2$ adsorbing amine sites. Consequently, this type of hybrid adsorbent is able to present relatively constant $CO_2$ adsorption capacities during repetitive use.

The hybrid adsorbent should be robust enough to avoid significant performance degradation during multi-cycle operations, in order to make atmospheric $CO_2$ capture cost-effective. Among the hybrid adsorbents tested, $CO_2$ adsorption capacities of the adsorbents incorporating hyperbranched aminopolymers, although lower than the ethylenimine-impregnated adsorbent, were found to be relatively constant. Based on these considerations, it is believed that the Class (iii) adsorbents incorporating hyperbranched aminopolymers are the most promising materials for $CO_2$ capture from ambient air among the hybrid adsorbents tested. This material is able to provide an adequate adsorption capacity toward dilute $CO_2$ sources like air under ambient conditions, while reversibly regenerating and capturing the adsorbed $CO_2$ without significant performance degradation during many cycles. The amine-based hybrid materials prepared by impregnation, grafting, and hyperbranching appear to have this capability.

RESULTS

In comparison to conventional $CO_2$ capture strategies based on removing $CO_2$ from high temperature flue gas, adsorptive fixation of $CO_2$ from the ambient air is an improvement in that it can be a carbon-negative technology that can actually reduce the current $CO_2$ level in the atmosphere. Different types of solid adsorbents were prepared, including representative examples of two of the classes of supported amine adsorbents, following a synthesis route of amine grafting (class ii) and hyperbranching polymerization (class iii) onto various support materials, such as hydrocarbon polymers, metal oxides, amorphous silica, and a mesoporous silica with one-dimensional channels.

In accordance with this invention, amines tethered to a variety of substrates were found to be useful for adsorbing $CO_2$ from ambient air, over repeated cycles, and without being assisted by supplementary processes or devices. The class (iii) hybrid of hyperbranched aminopolymers and mesoporous silica, SBA-15, exhibited an adequate adsorption capacity toward $CO_2$ of atmospheric concentration while maintaining its effectiveness over multiple cycles of adsorption and regeneration. The class (ii) adsorbent also behaved similarly, but exhibited slightly lower $CO_2$ adsorption capacities. The adsorptive properties of the HAS materials were also proven to be tunable by changing the amine loadings on the surface, which can be achieved simply by controlling the amount of initial monomer added to the synthesis. Based on these advantages of adequate capacity, regenerability, and tunable performance, these hybrid adsorbents can be positioned as promising materials for atmospheric $CO_2$ capture applications from the ambient air.

The foregoing disclosure sets forth the preferred embodiments of the present invention, but the full scope of the invention is defined by the following claims.

The invention that is herein claimed is as follows:

1. A method for the capture of C02 from dilute gas streams in a cyclical manner, the concentration of $CO_2$ in the gas stream being in the range of from 1-1000 ppm; the process comprising passing the dilute-C02 gas stream over a solid adsorbent at a substantially ambient temperature of not greater than 120° C., the solid adsorbent comprising an amine adsorbent tethered to a substrate, the tethered amine being selected from the group consisting of hyperbranched aminopolymers tethered to a substrate selected from the group consisting of a metal oxide, a porous silica and a porous hydrocarbon-based solid polymer support structure, wherein the amine is tethered to the substrate by covalent bonds; and a tethered amine prepared by the reaction of a silyl amine with an oxide substrate; and regenerating the solid adsorbent at a temperature of not substantially greater than about 120° C., to obtain a substantially concentrated CO2 gas stream and a regenerated adsorbent; and repeating the cycle.

2. The method of claim 1, wherein the substrate is a mesoporous silica.

3. The method of claim 2, wherein the tethered amine is a hyperbranched aminopolymer, forming a Class (iii) adsorbent with a substrate.

4. The method of claim 1, wherein the tethered amine is formed by the reaction of a silyl amine with a substrate selected from the group consisting of silica and metal oxides, to form a Class (ii) adsorbent.

5. The method of claim 4, wherein the silyl amme IS N-(3-(trimethoxysily l)propy 1)ethane-1,2-diamine.

6. The method of claim 1, wherein the tethered amine material comprises an aminefunctionalized porous polymer resin.

7. The method of claim 6, wherein the amine-functionalized porous polymer resin is a hydrocarbon polymer.

8. The method of claim 7, wherein the amine-functionalized porous polymer IS a porous poly(styrene) resin with benzylamine functional groups.

9. The method of claim 8 wherein the porous poly(styrene) resin with benzylamine functional groups is an aminomethylpolystyrene.

10. The method of claim 1 wherein the oxide substrate is a metal oxide.

11. The method of claim 10, wherein the oxide substrate-based tethered amine adsorbent is a metal oxide tethered to a hyperbranched aminopolymer.

12. The method of claim 11, wherein the hyperbranched aminopolymer results from the polymerization of aziridinc.

13. The method of claim 12, wherein the hyperbranched aminopolymer results from the reaction of aziridine and a porous silica substrate in the presence of a catalyst.

14. A cyclic process for the adsorption and capture of CO2 from ambient air, the process comprising cyclically passing air at ambient conditions through a bed of porous, solid material comprising an oxide substrate-based tethered amine adsorbent, to adsorb the CO2 from the air and form a CO2 loaded adsorbent, the adsorbent comprising a tethered amine derived from the group consisting of hyperbranched aminopolymers and a silylamine prepared by the reaction of a silyl diamine with an oxide substrate; regenerating the tethered amine, by separating the $CO_2$ from the adsorbent, at a temperature of not greater than 120° C. to form regenerated adsorbent and purified CO2; and capturing the purified CO2; and repeating the adsorption-regeneration process cycle.

15. The method of claim 14, wherein the substrate is a mesoporous silica.

16. The method of claim 14, wherein the tethered amine is a hyperbranched aminopolymer, forming a Class (iii) adsorbent with a substrate.

17. The method of claim 14 wherein the oxide substrate is a metal oxide.

18. The method of claim 17, wherein the oxide substrate-based tethered amine adsorbent is a metal oxide tethered to a hyperbranched aminopolymer.

* * * * *